United States Patent Office 3,792,100
Patented Feb. 12, 1974

3,792,100
PROCESS FOR THE VAPOR PHASE CATALYTIC ISOMERIZATION OF XYLENES
Takeshi Sonoda, Takeshi Hashiguchi, and Masaki Sato, Kamakura, Japan, assignors to Toray Industries, Inc., Tokyo, Japan
No Drawing. Continuation-in-part of abandoned application Ser. No. 66,857, Aug. 25, 1970. This application June 23, 1972, Ser. No. 265,539
Claims priority, application Japan, Aug. 26, 1969, 44/66,892
Int. Cl. C07c 5/24
U.S. Cl. 260—668 A                    8 Claims

ABSTRACT OF THE DISCLOSURE

A process for isomerizing xylenes which comprises contacting xylenes at an elevated temperature with a catalyst composition comprising a partially dealkalized mordenite-containing aluminosilicate, the aluminosilicate having a cation exchange capacity of not less than 60 m. eq./100 g., and containing, on ion exchange sites formed by aluminum atoms constituting the framework of pore structure in the aluminosilicate,
(1) 0.1 to 0.7 equivalent of alkali and alkaline earth metal ion per gram atom of the aluminum,
(2) 0.05 to 0.9 equivalent of at least one metal ion selected from the group consisting of copper, silver and chromium per gram atom of the aluminum and
(3) not more than 0.45 equivalent of hydrogen per gram atom of the aluminum.

This is a continuation-in-part of our co-pending application Ser. No. 66,857 filed Aug. 25, 1970, now abandoned.

This invention relates to a process for the vapor phase catalytic isomerization of xylenes.

The process for isomerizing xylenes, as practised in the present invention, is a process which involves inducing the intramolecular rearrangement of alkyl groups of an isomeric xylene mixture consisting of para-xylene, ortho-xylene and meta-xylene having the concentration of para-xylene below the thermodynamic equilibrium concentration, to thereby convert it to an isomeric xylene mixture containing para-xylene having a concentration substantially equal to the thermodynamic equilibrium concentration.

The solid acid catalysts such as silica-alumina and platinum-alumina-fluorine have been known in the art as catalysts for use in the vapor phase catalytic isomerization of xylenes. In recent years, the use of zeolite solid acid catalysts has been studied for the same purposes. However, the first-mentioned catalysts have such defects as low degrees of isomerization and shortness of lives, and the latter catalysts result in the low yields of xylenes because of the accompanying disproportionation reaction. Accordingly, the development of isomerizing catalysts free from such defects has been desired. Attempts to develop a process for isomerizing xylenes in high yields and high conversions wherein the life of the catalyst is extremely long and a disproportionation reaction is substantially inhibited, has led to the accomplishment of the present invention in which novel isomerizing catalysts are used.

According to the present invention, a process is provided for isomerizing xylenes which comprises contacting xylenes at elevated temperatures with a catalyst composition comprising partially dealkalized mordenite-containing aluminosilicate, the aluminosilicate having a cation exchange capacity of not less than 60 m. eq./100 g., and containing on the ion exchange sites formed by aluminum atoms constituting the framework of pore structure in the aluminosilicate,
(1) 0.1 to 0.7 equivalent of alkali and alkaline earth metal ion per gram atom of the aluminum,
(2) 0.05 to 0.9 equivalent of at least one metal ion selected from the group consisting of copper, silver and chromium per gram atom of the aluminum and
(3) not more than 0.45 equivalent of hydrogen ion per gram atom of the aluminum.

One of the constituents of the catalyst used in the invention is an aluminosilicate containing mordenite. Mordenite comes within the group of zeolites which are three-dimensional crystalline aluminosilicates. Zeolite has a structure characterized by an open three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to 2. The three-dimensional framework is of porous structure in which pores contain molecules of water and cations such as alkali metal and alkaline earth metal ions, the negative electrovalence of the tetrahedra containing aluminum being balanced by the inclusion of the cations, and such aluminum is called an ion exchange site herein. Mordenite used in the invention is one which particularly has a three-dimensional crystalline structure of aluminosilicate as characterized by the CuKa X-ray diffraction peak of Bragg's reflective angle $2\theta=13.4°, 25.6°, 27.7°$.

Mordenites include both artificial and natural mordenites. In any case, the mordenites are present as one component of aluminosilicates. The amounts of mordenites included in the aluminosilicates can vary over a wide range from substantially 100% to about 10% by weight. Generally, artificial mordenites are contained in aluminosilicates in greater quantities than naturally occurring mordenites. The content of mordenite in the aluminosilicate can be measured by X-ray. But the cation-exchange capacity can be used as a suitable measure of the mordenite content. The method of measuring the cation-exchange capacity is very well known to those skilled in the art, and one typical method we can cite is the Schöllenberger method. The mordenite-containing aluminosilicate used as the catalyst ingredient used in the invention may be an artificial or naturally occurring one, but is required to have a cation-exchange capacity of not less than 60 m. eq./100 g.

The mordenite contained in the aluminosilicate used in the present invention should be partially dealkalized. It is known that the mordenite-containing aluminosilicate contains on its ion exchange sites, alkali metal ions or alkaline earth metal ions, which are exchangeable with other cations by the ion-exchange method. The exchange of these alkali metal ions or alkaline earth metal ions with other cations is termed "dealkalization" in the present specification and claims. The cation exchange in the dealkalization is effected substantially at the mordenite in the aluminosilicate. The degree of dealkalization of mordenite in the catalyst composition of the invention should be such that alkali or alkaline earth metal ions are contained in the aluminosilicate in an amount of 0.1–0.7 equivalent per gram-atom of aluminum which is contained in the mordenite-containing aluminosilicate and forms an ion-exchange site. The ion-exchange sites are formed by aluminum atoms which form $AlO_4$ tetrahedra and thereby constitute the framework of the pore structure of the aluminosilicate. The ion-exchange sites are substantially contained in the mordenite part of the aluminosilicate.

As will be apparent from the foregoing definition, aluminum elements contained in aluminum compounds such as alumina sol or alumina which are added as binders or diluents in the formation of catalyst, or aluminum elements introduced by ion exchange with the alkali or alkaline earth metal ions are not included within the aluminums which form an ion exchange site.

One type of dealkalization is the substitution of alkali and alkaline earth metal ions on the ion exchange sites by specific metal ions.

Before this invention it had been known that the aluminosilicate containing partially dealkalized mordenite has only insufficient effect of isomerizing xylenes, but it has now been found that the use of such aluminosilicate in conjunction with at least one metallic element selected from copper, silver and chromium leads to an increase in isomerizing activity, an increase in selectivity and a marked prolongation of the catalyst life.

The amount of the above metals contained in the aluminosilicate on the ion exchange sites is 0.05 to 0.9 equivalent, preferably 0.1 to 0.9 equivalent, per gram atom of the aluminum forming ion exchange site. These metals can be contained by the aluminosilicate not only on the ion exchange sites but also in a state merely supported as a compound thereof. In this case the total amount of these metals may be 0.2 to 18.0% by weight, preferably 0.6 to 12.0% by weight based on the weight of the aluminosilicate calculated as elemental metal.

Another type of dealkalization is the substitution of alkali or alkaline earth metal ions on the ion exchange sites by hydrogen ions. The introduction of hydrogen ions onto the ion exchange sites can be carried out directly by the treatment of the aluminosilicate with an acid or indirectly by ion exchange with a solution containing ammonium followed by the calcination as described hereunder.

In the catalyst composition used in the process of this invention, the amount of hydrogen ions should not be more than 0.45 equivalent per gram atom of the aluminum forming ion exchange site.

The mordenite containing aluminosilicate dealkalized to contain more than 0.45 equivalent of hydrogen ion is not preferable as the catalyst for the process of this invention, because the yield of xylenes is markedly declined as the amount of hydrogen ion increases. This decline is caused by the high activity for disproportionation reaction of the aluminosilicate having a higher hydrogen ion content.

This second type of dealkalization is not essential for the catalyst used in this invention. But even when the aluminosilicate is dealkalized so as to contain hydrogen ions on the ion exchange sites, at least one of the above mentioned metals should be incorporated onto the ion exchange sites of the aluminosilicate. In this case the total amount of hydrogen ion and the metal ions should be 0.3 to 0.9 equivalent per gram atom of aluminum forming ion exchange site and in addition to that the amount of the hydrogen ion should be not more than 0.45 equivalent per gram atom of the aluminum.

The catalytic composition used in the process of this invention can be prepared by a conventional method. One desirable method involves exchanging the alkali metal ions or alkaline earth metal ions on ion exchange sites with the cations of an aqueous solution of an acid or an ammonium salt. As the acid, mineral acids such as hydrochloric acid and nitric acid, and organic acids such as oxalic acid and acetic acid are used. The ammonium salt that can be used for this purpose preferably includes water-soluble ammonium salts such as ammonium chloride, ammonium nitrate and ammonium carbonate. The temperature to about 200° C., but generally, the temperatures in the range of about 70 to 100° C. are preferred. The dealkalization time varies according to the dealkalization temperature, the types and concentration of the treating liquid, the types and grain sizes of the mordenite-containing aluminosilicate, and the desired degree of dealkalization, but usually ranges from 5 minutes to 20 hours.

When the aluminosilicate is, at first, dealkalized with an aqueous solution of an acid or an ammonium salt at least one metal ion selected from copper, silver and chromium should be added to the partially dealkalized aluminosilicate.

These metal ions can be added by conventional methods such as immersion, precipitation and ion exchange either before or after calcination of the aluminosilicate. In this case even when the aluminosilicate is dealkalized by acid or ammonium ion so as to contain more than 0.45 equivalent per gram atom of aluminum forming ion exchange site, the hydrogen or ammonium ions can be resubstituted by metal ions selected from copper, silver or chromium to reduce the amount of hydrogen and ammonium ions to not more than 0.45 equivalent per gram atom of the aluminum. Catalysts prepared in this way can also be used in the process of the present invention.

Aluminosilicate containing the partially dealkalized mordenite is molded in suitable shapes and calcined at a temperature of 400 to 700° C. for use as catalysts.

Another convenient method of dealkalization involves exchanging the alkali metal ions or alkaline earth metal ions in the mordenite with ions of copper, silver, and/or chromium. Such ion-exchange treatment is effected by a known manner using an aqueous solution of copper, silver and/or chromium salt. Examples of these salts include salts of mineral acids such as nitrates, sulfates and chlorides, and salts of organic acids such as acetates, which are soluble in water to form copper, silver or chromium ions which are exchangeable. The dealkalization temperature can be varied from room temperature to 200° C., but generally the temperatures in the range of 70 to 110° C. are preferred. The dealkalization time varies depending upon the dealkalization temperature, the types and concentrations of the treating solution, and the types and grain sizes of aluminosilicate containing mordenite, but usually about 5 minutes to 48 hours is satisfactory.

When the dealkalization is performed by using a dilute solution, the procedure is preferably repeated two times or more.

The aluminosilicate containing mordenite ion-exchanged with the metal ions is washed with water to remove excess copper, silver or chromium salt, dried, molded into suitable shapes, calcined at 400 to 700° C., and the product is used as a catalyst in the invention. Catalyst compositions obtained by adding copper, silver and/or chromium further to the aforementioned aluminosilicate catalyst composition by methods other than the ion-exchange method such as the precipitation method and impregnation method are also within the scope of the present invention insofar as the contents of copper, silver and/or chromium are within the range specified in the present invention.

Still another convenient method of dealkalization involves using a mixture of an aqueous solution of an acid or an ammonium salt and an aqueous solution of a copper, silver, and/or chromium salt as the dealkalizing solution. In this case, catalyst compositions obtained by adding copper, silver, and/or chromium further to the resulting aluminosilicate catalysts in which the alkali metal ions or alkaline earth metal ions have been exchanged, by methods other than the ion exchange method, such as the precipitation method or the impregnation method are also included within the scope of the present invention.

Some of the naturally occurring mordenites are available in a partially dealkalized state, and so it is not necessary to dealkalize them.

The catalyst composition used in the present invention which contains 0.1 to 0.9 equivalent of the alkali metal ions and alkaline earth metal ions per gram-atom of aluminum forming an ion-exchange site can also be prepared by adding alkali metals and alkaline earth metals to aluminosilicate containing copper, silver, and/or chromium and containing highly dealkalized mordenite having not more than 0.1 equivalent of alkali metal ions and alkaline earth metals per gram-atom of aluminum forming an ion-exchange site.

The critical feature of the present invention resides in the use of a catalyst composition prepared from a mordenite-containing aluminosilicate having a cation exchange capacity of not less than 60 m. eq./100 g., the mordenite of the aluminosilicate having been dealkalized partially so that the aluminosilicate contains 0.1 to 0.7 equivalent of alkali metal ions and alkaline earth metal ions per gram-atom of aluminum in the aluminosilicate which forms an ion-exchange site. Surprisingly, a catalyst composition prepared in the same way as mentioned above except that the aluminosilicate contains another zeolite such as faujasite instead of mordenite causes the disproportionation reaction of xylenes concurrently with their isomerization, and therefore a reduction in the yield of xylenes. If the aforementioned aluminosilicate containing partially dealkalized mordenite contains other metals than copper, silver and chromium, its use as an isomerizing catalyst results in a reduced yield of xylene and a reduced isomerizing activity, and such catalyst is not feasible.

It has not been completely known why the catalyst used in the present invention induces only an isomerization reaction with high isomerizing activity while inhibiting the occurrence of a disproportionation reaction, but this is due probably to the following. It is generally accepted that in a reaction using a solid acid catalyst within which the catalyst of the invention comes, the optimum acid strength for activating the reaction is present in the solid acid catalyst depending upon the type of the reaction. Therefore, the object of obtaining the maximum amount of the product with good efficiency, namely increasing the selectivity of the desired reaction, cannot be achieved merely by a large acid strength. For instance, aluminosilicate containing a completely dealkalized mordenite has a very large acid strength and a strong isomerizing activity, but the use of it as a catalyst for the isomerizing reaction of xylenes naturally results in a marked decline in the yield of xylenes since it also has a very high activity for disproportionation. When the mordenite contained in the aluminosilicate is partially dealkalized, the dealkalization begins to occur at a relatively easily dealkalizable site of the mordenite, and the acid site necessary for the isomerization reaction will finally be activated. But the sites of stronger activity do not undergo the dealkalization, and remain bonded with the alkali metal. In other words, it is assumed that the stronger acid site is in a state of being poisoned by the alkali metal. If such a catalyst is used, the isomerization reaction alone is selectively performed, and the disproportionation reaction is remarkably inhibited. The aforementioned behavior towards the dealkalization treatment is peculiar to mordenite. It has thus been found that mordenite differs greatly from other zeolites such as faujasite in this regard. When aluminosilicate containing the partially dealkalized mordenite includes copper, silver, and/or chromium, the isomerizing activity of the aluminosilicate is increased, and the disproportionation activity inhibited at the same time. In addition, the inclusion of these metals helps to prolong the life of the aluminosilicate catalyst.

The process of the present invention induces an isomerization reaction by contacting xylenes with the catalyst so prepared, and is preferably achieved as the catalytic vapor phase reaction. The temperature of reaction is preferably from 200 to 600° C. The reaction pressure may be atmospheric or elevated pressures, but usually from 1 to 100 atmospheres. The time factor W.F. (g.-cat. hr./g. mol of starting materials ... W: the weight of catalyst, F: the amount in the moles of the starting alkyl aromatic hydrocarbons per hour) is not particularly limited. To obtain high conversions, the time factor of 5 to 200 is preferable, especially from 20 to 100. The process of the present invention is preferably practiced in the presence of hydrogen gas. Hydrogen serves mainly to inhibit the deposition of a carbonaceous matter on the catalyst and prolong the life of the catalyst. The amount of hydrogen to be added to xylenes is not particularly limited, but amounts below 50 molar times are sufficient, and 3 to 20 molar times are especially preferable.

Addition of water or aqueous ammonia to the reaction system as practiced in the use of a silica-alumina catalyst leads to increased selectivity.

According to the process of the present invention, metaxylene which is relatively less valuable commercially can be converted to paraxylene or orthoxylene which have greater utility.

The presence of naphthenic or paraffinic hydrocarbons or aromatic hydrocarbons such as ethylbenzene during the practice of the process of the invention does not detrimentally effect the catalyst used in the invention and the isomerization of xylenes.

The process of the invention will be described in detail by the following illustrative examples.

EXAMPLE 1

Powder of synthetic mordenite having an ion exchange capacity of 230 m. eq./100 g. and a silica-to-alumina ratio of 9.8 and expressed by the composition formula $(Na_{1.68}Mg_{0.07}Ca_{0.09})O \cdot Al_2O_3 \cdot 9.8(SiO_2)$ was treated with an aqueous solution of ammonium chloride to form aluminosilicates containing mordenite partially dealkalized to a degree of approximately 6, 34, 67 and 92, respectively. Each of these aluminosilicates contained 0.94, 0.66, 0.33, and 0.08 equivalent respectively of alkali metal ions and alkaline earth metal ions per gram-atom of aluminum forming an exchange site, and these aluminosilicates had the following compositions.

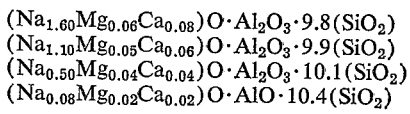

$(Na_{1.60}Mg_{0.06}Ca_{0.08})O \cdot Al_2O_3 \cdot 9.8(SiO_2)$
$(Na_{1.10}Mg_{0.05}Ca_{0.06})O \cdot Al_2O_3 \cdot 9.9(SiO_2)$
$(Na_{0.50}Mg_{0.04}Ca_{0.04})O \cdot Al_2O_3 \cdot 10.1(SiO_2)$
$(Na_{0.08}Mg_{0.02}Ca_{0.02})O \cdot AlO \cdot 10.4(SiO_2)$ These mordenites were dried at 200° C., and immersed in an aqueous 6.0 wt. percent solution of copper nitrate to thereby support the copper nitrate in an amount of 8.0% by weight calculated as copper.

A part of the copper supporting mordenite thus obtained was taken as a sample and washed with water to remove the copper nitrate which is merely supported on the mordenite.

The washed samples was found to have the following compositions respectively,

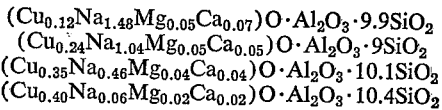

$(Cu_{0.12}Na_{1.48}Mg_{0.05}Ca_{0.07})O \cdot Al_2O_3 \cdot 9.9SiO_2$
$(Cu_{0.24}Na_{1.04}Mg_{0.05}Ca_{0.05})O \cdot Al_2O_3 \cdot 9SiO_2$
$(Cu_{0.35}Na_{0.46}Mg_{0.04}Ca_{0.04})O \cdot Al_2O_3 \cdot 10.1SiO_2$
$(Cu_{0.40}Na_{0.06}Mg_{0.02}Ca_{0.02})O \cdot Al_2O_3 \cdot 10.4SiO_2$ The resultant mordenite supporting 8.0% by weight of copper was dried at 120° C. without washing with water. The mordenites were molded into pellets having a size of 3 mm. x 3 mm., and calcined for 18 hours at 520° C. These were designated as catalysts A, B, C and D respectively.

These catalysts contain the following amounts of hydrogen ion and the following total amounts of alkali and alkaline earth metal ions on ion exchange sites, which can be calculated on the basis of their compositions cited above.

| Catalyst | Hydrogen ion (equivalent per gram atom of aluminum) | Alkali and alkaline earth metal ions (equivalent per gram atom of aluminum) |
|---|---|---|
| A | 0.02 | 0.86 |
| B | 0.14 | 0.63 |
| C | 0.34 | 0.31 |
| D | 0.53 | 0.07 |

Catalysts B and C are the catalysts of the present invention, and the catalysts A and D are outside the scope of the present invention.

Metaxylene was introduced at a rate of 23.5 g./hour, and isomerized at a temperature of 500° C. (for catalyst A) and 380° C. (for catalysts B, C and D) and at a pressure of 5 kg./cm.² using 12.8 g. of the catalyst. Hydrogen was introduced at a rate of 60 N-liter/hour. No change in catalytic activity was observed for a period of 8 hours. The results obtained are shown in Table 1.

TABLE 1

| Catalyst | A[1] | B | C | D[1] |
|---|---|---|---|---|
| Reaction products (mol percent): | | | | |
| Benzene | | | | 0.9 |
| Toluene | 0.1 | 0.2 | 0.6 | 8.1 |
| p-Xylene | 3.1 | 13.4 | 21.4 | 19.3 |
| m-Xylene | 93.3 | 72.9 | 56.1 | 45.4 |
| o-Xylene | 3.4 | 13.3 | 21.3 | 19.4 |
| C₉+aromatic | 0.1 | 0.2 | 0.6 | 6.9 |
| Xylene recovery (mol percent) | 99.8 | 99.6 | 98.8 | 84.1 |
| Concentration of p-xylene in the recovered xylenes (percent) | 3.1 | 13.5 | 21.7 | 23.0 |

[1] Control.

EXAMPLE 2

Powder of synthetic mordenite having a cation exchange capacity of 220 m. eq./100 g. and a silica-alumina ratio of 10.5 and expressed by the composition formula $(Na_{1.92}K_{0.06}Ca_{0.01})O \cdot Al_2O_3 \cdot 10.5(SiO_2)$ was treated with 4 N hydrochloric acid to form a partially dealkalized mordenite in which the mordenite structure was destroyed. Aluminosilicate containing this mordenite included 0.16 equivalent of alkali metal (Na and K) ions per gram-atom of aluminum forming an exchange site. The aluminosilicate was treated with an aqueous 4.0 wt. percent solution of copper nitrate to thereby support copper in an amount of 5.2% by weight. A part of the copper supporting aluminosilicate was washed with water to remove copper nitrate merely supported thereon and elementally analyzed. The composition of this aluminosilicate was found to be $$(Cu_{0.42}Na_{0.29}K_{0.03})O \cdot Al_2O_3 \cdot 15.5SiO_2$$

and therefore the amounts of hydrogen ion and the total of alkali and alkaline earth metal ions are 0.42 and 0.16 equivalent per gram atom of aluminum forming ion exchange site.

The resultant mordenite supporting 5.2% by weight of copper was dryed without washing with water, molded into pellets and calcined for 6 hours at 550° C. (catalyst E).

As a comparative example, the partially dialkalized mordenite before supporting of copper was calcined in the same way, and the calcined product was designated as catalyst F. The composition of this mordenite was $$(Na_{0.29}K_{0.03})O.Al_2O_3 \cdot 15.4SiO_2$$

and therefore the amounts of hydrogen ion and alkali or alkaline earth metal ions are respectively 0.84 and 0.16 equivalent per gram atom of aluminum forming ion exchange site.

Ortho-xylene was introduced at a rate of 23.5 g./hour, and isomerized at a temperature of 380° C. and 5 kg./cm.² using these two catalysts respectively. Hydrogen was introduced at a rate of 60 N-liter/hour. The results obtained are given in Table 2.

TABLE 2

| | Catalyst | | | | | |
|---|---|---|---|---|---|---|
| | E | | | F (control) | | |
| Reaction time (hour) | 0–2 | 2–4 | 4–6 | 0–2 | 2–4 | 4–6 |
| Reaction products (mol percent): | | | | | | |
| Benzene | 0.2 | 0.1 | 0.1 | 2.3 | 1.7 | 0.6 |
| Toluene | 1.9 | 1.5 | 1.5 | 9.4 | 7.0 | 5.4 |
| p-Xylene | 18.3 | 17.4 | 17.3 | 16.2 | 15.5 | 14.0 |
| m-Xylene | 48.7 | 50.1 | 50.1 | 45.8 | 42.0 | 39.5 |
| o-Xylene | 29.5 | 29.7 | 29.8 | 17.5 | 27.4 | 35.7 |
| C₉+ aromatics | 1.4 | 1.2 | 1.2 | 8.8 | 6.4 | 4.8 |
| Recovery of xylene (mol percent) | 96.5 | 97.2 | 97.2 | 78.5 | 84.9 | 89.2 |
| Conversion of xylene (mol percent) | 70.5 | 70.3 | 70.2 | 82.5 | 72.6 | 64.3 |

It is seen from the results obtained that there was substantially no change in catalytic activity due to the addition of copper, and the disproportionation reaction as a side-reaction was inhibited to obtain an increased yield of xylenes.

EXAMPLE 3

The ammonium-type mordenite containing 0.66 equivalent of alkali metal ions and alkaline earth metal ions per gram-atom of aluminum forming an ion-exchange site which was obtained in Example 1 was subjected with ion-exchange with silver and chromium using an aqueous 5 wt. percent solution of silver nitrate and an aqueous 5 wt. percent of chromium nitrate to thereby support silver and chromium. Part of the alkali metal decreased by being ion exchanged, and 0.38 and 0.53 equivalent respectively of alkali metal and alkaline earth metal ions per gram-atom of aluminum after ion-exchange was detected. The partially dealkalized mordenites had the following compositions $$(Ag_{0.98}Na_{0.64}Mg_{0.03}Ca_{0.03})O \cdot Al_2O_3 \cdot 10.1(SiO_2)$$

$$(Cr_{0.30}Na_{0.88}Mg_{0.04}Ca_{0.05})O \cdot Al_2O_3 \cdot 9.9(SiO_2)$$

and therefore the amounts of hydrogen ion are 0.13 and 0.02 equivalent per gram-atom of aluminum forming ion exchange site respectively. These catalysts contained 12.5% by weight and 2.1% by weight of silver and chromium, respectively. These catalysts were calcined for 18 hours at 550° C., and designated as catalysts G and H.

Meta-xylene was introduced at a rate of 23.5 g./hour, and isomerized at a temperature of 410° C. and a pressure of 12 kg./cm.² using 12.8 g. of each of the catalysts. Hydrogen was introduced at a flow rate of 60 N-liter/hour. The results obtained are shown in Table 3.

TABLE 3

| Catalyst | G | H |
|---|---|---|
| Reaction products (mol percent): | | |
| Toluene | 1.2 | 0.3 |
| p-Xylene | 21.5 | 17.5 |
| m-Xylene | 54.9 | 64.3 |
| o-Xylene | 21.4 | 17.7 |
| C₉ aromatic | 1.0 | 0.2 |
| Recovery of xylene (mol percent) | 97.8 | 99.5 |
| Concentration of p-xylene in the recovered xylenes (percent) | 22.0 | 17.6 |

EXAMPLE 4

Naturally occurring mordenite tuff having a cation exchange capacity of 130 m eq./100 g. and a silica-to-alumina ratio of 9.3 and expressed by the composition formula $$(Na_{0.88}K_{0.10}Mg_{0.07}Ca_{0.38})O \cdot AlO \cdot 9.3(SiO_2)$$

was pulverized to a size of 6–12 mesh, and dealkalized with a 2 N aqueous solution of ammonium nitrate to form aluminosilicate containing mordenite containing 0.44 equivalent of alkali metal ions and alkaline earth metal ions per gram-atom of aluminum forming an ion-exchange site.

The aluminosilicate was added to an aqueous solution containing both copper nitrate and silver nitrate, the amounts of which are 5.0% and 2.0% by weight calculated as metallic copper and silver on the basis of the aluminosilicate. The resulting mixture was evaporated to dryness, and calcined for 18 hours at 520° C.

The chemical composition of this aluminosilicate was determined after the removal of the copper and silver nitrates which are merely supported similarly to the method described in Example 1 and found to be $$(Cu_{0.24}Ag_{0.12}Na_{0.26}K_{0.04}Mg_{0.04}Ca_{0.18})O \cdot Al_2O_3 \cdot 9.8SiO_2$$

The amounts of hydrogen ion and the total of alkali and alkaline earth metal ions are 0.33 and 0.37 equivalent per gram atom of aluminum forming ion exchange site.

A mixture of 21% ethylbenzene, 65% metaxylene, 9% para-xylene and 5% ortho-xylene was introduced at a rate of 23.5 g./hour, and isomerized at a temperature of 380° C. and a pressure of 5 kg./cm.² using 25.6 g. of the catalyst thus obtained. Hydrogen was introduced at a flow rate of 60 N-liter/hour. The yield of C₈ aromatic hydrocarbon during the 24-hour reaction period was 97.8%, and the product contained 20.3% ethylbenzene, 44.0% meta-xylene, 19.7% para-xylene and 16.0% ortho-xylene. Also, 1.1% toluene and 1.1% $C_9$ aromatic were formed by the disproportionation reaction. There was substantially no change in catalytic activity for a period of 24 hours.

EXAMPLE 5

500 grams of 12–20 mesh particles of naturally occurring mordenite having an ion exchange capacity of 148 m. eq./100 g. were subjected three times with ion exchange treatment using one liter of an aqueous 5 wt. percent (as metallic copper) solution of copper nitrate at 80° C. (four hours for each treatment). Thereafter, the mordenite was thoroughly washed with water to remove excess copper nitrate. After drying, the resulting mordenite was calcinated for 12 hours at 520° C. to form a catalyst designated as catalyst J.

The amount of metallic copper contained in this catalyst was 2.2% by weight (0.44 equivalent), and 0.51 equivalent of alkali and alkaline earth metal ions per gram-atom of the aluminum forming an exchange site was detected. The amount of hydrogen ion is, therefore, 0.05 equivalent per gram atom of the aluminum.

500 grams of the same naturally occurring mordenite were treated twice (for four hours each time) using one liter of an aqueous solution of silver nitrate containing 3% by weight of metallic silver. Thereafter the mordenite was washed thoroughly with water to remove excess silver nitrate, dried, and then calcined for 12 hours at 520° C. to form a catalyst designated as catalyst K.

This catalyst contained 9.0% by weight of metallic silver (0.63 equivalent), and 0.32 equivalent of alkali and alkaline earth metal ions per gram-atom of the aluminum forming an ion exchange site was detected. The amount of hydrogen ion is, therefore, 0.05 equivalent per gram atom of the aluminum.

Meta-xylene was introduced at a rate of 22 g./hour, and isomerized at a temperature of 410° C. and a pressure of 20 kg./cm.$^2$ using 10 g. of the catalyst so obtained. Hydrogen was introduced at a flow rate of 24 N-liter/hour. The results obtained at the end of the 8-hour period after initiation of the reaction are shown in Table 4.

TABLE 4

| Catalyst | J | K |
|---|---|---|
| Reaction products (mol percent): | | |
| Toluene | 0.52 | 0.91 |
| p-Xylene | 23.04 | 21.95 |
| m-Xylene | 53.51 | 55.07 |
| o-Xylene | 22.53 | 21.36 |
| $C_9$ aromatic | 0.40 | 0.71 |
| Recovery of xylene (mol percent) | 99.08 | 98.38 |
| Concentration of p-xylene in the recovered xylene (percent) | 23.25 | 22.31 |

The results obtained at the end of 150-hour reaction period after initiation of the reaction are shown in Table 5. Table 5 also shows the results obtained when the temperature was elevated by 10° C. at this point and the reaction was performed for 10 hours at 420° C.

TABLE 5

| | Reaction time | |
|---|---|---|
| | 150 hrs. | 160 hrs. |
| Reaction temperature (° C.) | 410 | 420 |
| Reaction products (mol. percent): | | |
| Benzene | 0 | 0 |
| Toluene | 0.33 | 0.45 |
| p-Xylene | 22.14 | 23.11 |
| m-Xylene | 55.74 | 53.49 |
| o-Xylene | 21.54 | 22.60 |
| $C_9$ aromatic | 0.25 | 0.35 |
| Recovery of xylenes (mol. percent) | 99.42 | 99.20 |
| Concentration of p-xylene in the recovered xylenes (percent) | 22.26 | 23.30 |

COMPARATIVE EXAMPLE 1

The same mordenite as used in Example 5 was calcined for 12 hours at 520° C. without subjecting it to any treatment. The resulting product was designated as catalyst L. This catalyst had 93 equivalents of the alkali and alkaline earth metal ions per gram-atom of aluminum forming an ion exchange site.

Using 10 g. of the catalyst so obtained, the reaction was performed under the same reaction conditions. The results obtained are shown in Table 6 below.

TABLE 6

| | Catalyst L |
|---|---|
| Reaction temperature (° C.) | 410 |
| Reaction products (mol percent): | |
| Toluene | 0.04 |
| p-Xylene | 1.42 |
| m-Xylene | 97.04 |
| o-Xylene | 1.50 |
| $C_9$ aromatic | |
| Recovery of xylenes (mol percent) | 99.96 |
| Concentration of paraxylene in the recovered xylenes (percent) | 1.42 |

EXAMPLE 6

500 grams of synthetic mordenite having an ion exchange capacity of 220 m. eq./100 g. were subjected to an ion exchange treatment twice (4 hours each time) at 80° C. using one liter of an aqueous solution of copper nitrate containing 4% by weight of metallic copper. After thorough washing with water, the treated mordenite was molded into pellets having a size of 3 mm. x 3 mm. $\phi$, and calcined for 12 hours at 520° C. The catalyst obtained was designated as catalyst M. This catalyst contained 3.4% by weight of metallic copper (0.46 equivalent). The amount of the alkali and alkaline earth metal was 0.54 equivalent per gram-atom of aluminum forming an ion exchange site. Therefore, this catalyst contains no hydrogen ion on the ion exchange sites.

The same synthetic mordenite as used in the preparation of catalyst M was subjected twice to ion exchange treatment (for 4 hours each time) at 80° C. using one liter of aqueous solution of silver nitrate containing 3% by weight of metallic silver. After thorough washing with water, the treated mordenite was molded into pellets having a size of 3 mm. x 3 mm. $\phi$, and calcined for 12 hours at 520° C. The resulting catalyst was designated as catalyst N. This catalyst contained 11.3% by weight of silver as metal (0.52 equivalent), and the amounts of the alkali and alkaline earth metals were 0.48 equivalent per gram-atom of aluminum which forms an ion-exchange site. Therefore this catalyst contains no hydrogen ion on the ion exchange sites.

Using 10 g. of the catalysts so obtained, the same reaction as above was performed under the same conditions as set forth in Example 5 except the reaction temperatures indicated in Table 7 were used. The results obtained are shown in Table 7.

TABLE 7

| | Catalyst | |
|---|---|---|
| | M | N |
| Reaction temperature (° C.) | 410 | 380 |
| Reaction products (mol percent): | | |
| Benzene | 0 | 0.05 |
| Toluene | 0.88 | 1.00 |
| p-Xylene | 22.29 | 22.25 |
| m-Xylene | 53.95 | 54.73 |
| o-Xylene | 22.20 | 21.17 |
| $C_9$ aromatic | 0.68 | 0.80 |
| Recovery of xylenes (mol percent) | 98.44 | 98.15 |
| Concentration of p-xylene in the recovered xylenes (percent) | 22.64 | 22.67 |

EXAMPLE 7

500 grams of 12–20 mesh particles of naturally occurring mordenite having a cation exchange capacity of 148 m eq./100 g. were subjected once to ion exchange treatment at 80° C. for four hours using an aqueous solution of copper sulfate containing 5% by weight of metallic copper. After thorough washing, excess copper sulfate was removed, and the treated mordenite was dried. This was followed by calcination at 560° C. for 12 hours. The catalyst obtained was designated as catalyst O. This catalyst contained metallic copper in an amount of 0.9% by weight (0.30 equivalent). The amounts of the alkali and alkaline earth metals were 0.70 equivalent per gram-atom of aluminum forming an ion exchange site. This catalyst contains no hydrogen ion on the ion exchange sites.

Catalyst P was prepared by treating the same mordenite three times (for four hours each time) in the same manner as described above. This catalyst contained 2.1% by weight of copper (0.53 equivalent). The amounts of the alkali and alkaline earth metals were 0.47 equivalent per gram-atom of aluminum forming an ion exchange site. This catalyst contains no hydrogen ion on the ion exchange sites.

A mixture of 9.3 mol percent of $C_8$ naphthene, 4.0 mol percent of $C_8$ paraffin, 18.7 mol percent of ethylbenzene, 3.5 mol percent of p-xylene, 50.9 mol percent of m-xylene, and 13.6 mol percent of o-xylene was introduced at a rate 22 g./hour, and isomerized at the temperature indicated in Table 8 and a pressure of 20 kg./cm.$^2$ using 10 g. of the catalyst so obtained. Hydrogen was introduced at a flow rate of 24 N-ester/hour. The results obtained are shown in Table 8.

TABLE 8

| | Catalyst | |
|---|---|---|
| | O | P |
| Reaction temperature (° C.) | 440 | 410 |
| Reaction products (mol percent): | | |
| $C_8$ naphthene | 8.60 | 8.66 |
| $C_8$ paraffin | 3.42 | 3.65 |
| Benzene | 0.45 | 0.52 |
| Toluene | 0.73 | 0.96 |
| Ethylbenzene | 17.98 | 17.98 |
| p-Xylene | 15.52 | 15.54 |
| m-Xylene | 37.27 | 36.17 |
| o-Xylene | 15.10 | 15.43 |
| $C_9$ aromatic | 0.56 | 0.74 |
| $C_{10}$ aromatic | 0.38 | 0.44 |
| $C_8$ recovery (mol percent) | 97.89 | 97.34 |
| Xylene recovery (mol percent) | 99.84 | 98.60 |
| Concentration of p-xylene in the recovered xylenes (percent) | 22.86 | 23.18 |

EXAMPLE 8

Naturally occurring mordenite tuff having a cation exchange capacity of 148 m. eq./100 g. was pulverized to a size 12–20 mesh. 50 grams of the mordenite so pulverized were subjected twice to an ion exchange treatment (for 8 hours each time) at 80° C. using 100 ml. of an aqueous solution of chromium nitrate containing 5% by weight of metallic chromium. By thorough washing with water, excess chromium nitrate was removed. The treated mordenite was dried, and calcined at 520° C. for 12 hours. The resulting catalyst contained 1.1% by weight of chromium (0.48 equivalent), and the amounts of the alkali and alkaline earth metals were 0.52 equivalent per gram-atom of aluminum forming an ion exchange site. This catalyst contains no hydrogen ion on the ion exchange sites.

Meta-xylene was introduced at a rate of 22 g./hour and isomerized at 380° C. and 20 kg./cm.$^2$. Hydrogen was introduced at a rate of 24 liters/hour. The results obtained are shown in Table 9.

TABLE 9

| Reaction products (mol percent): | |
|---|---|
| Toluene | 1.3 |
| p-Xylene | 21.8 |
| m-Xylene | 55.1 |
| o-Xylene | 20.8 |
| $C_9$+ aromatic | 1.0 |
| Recovery of xylenes (mol percent) | 97.7 |
| Concentration of p-xylene in the recovered xylenes (percent) | 22.3 |

COMPARATIVE EXAMPLE 2

Fifty grams of the same synthetic mordenite as used in Example 6 were subjected six times to an ion exchange treatment (for four hours each time) using 100 ml. of an aqueous solution of copper nitrate containing 6% by weight of metallic copper at a temperature of 80° C. The treated mordenite was thoroughly washed, molded into pellets having a size of 3 mm. x 3 mm. $\phi$, and calcined for 12 hours at 520° C. The catalyst obtained was designated as catalyst Q. This catalyst contained 7.3% by weight of metallic copper, and the amounts of the alkali and alkaline earth metals were 0.05 equivalent per gram-atom of the aluminum forming an ion exchange site.

In the same manner as described above, the mordenite was treated with an aqueous solution of silver nitrate containing 6% by weight of silver, and catalyst R was prepared. This catalyst contained 20.9% by weight of metallic silver, and the amounts of the alkali and alkaline earth metals were 0.02 equivalent per gram-atom of aluminum forming an ion exchange site.

The reaction was performed under the same conditions as described in Example 5 except that the temperatures indicated in Table 10 were used and 10.0 g. of the catalysts so obtained were used. The results obtained are given in Table 10.

TABLE 10

| | Catalyst | |
|---|---|---|
| | Q | R |
| Reaction temperature (° C.) | 380 | 380 |
| Reaction products (mol percent): | | |
| Benzene | 0.94 | 1.16 |
| Toluene | 7.60 | 14.12 |
| p-Xylene | 18.90 | 16.10 |
| m-Xylene | 46.00 | 38.22 |
| o-Xylene | 18.46 | 15.59 |
| $C_9$+ aromatic | 8.10 | 14.31 |
| Recovery of xylenes (mol percent) | 83.36 | 69.91 |
| Concentration of p-xylene in the recovered xylenes (percent) | 22.67 | 23.03 |

COMPARATIVE EXAMPLE 3

Fifty grams of molecular sieves "Y" (SK–40) (faujasite produced by Linde Corporation, U.S.A.) were subjected once to an ion exchange treatment for 4 hours at 80° C. using 100 ml. of an aqueous solution of copper nitrate containing 5% by weight of metallic copper. The treated faujasite was thoroughly washed with water, molded into pellets of 3 mm. x 3 mm. $\phi$, and calcined for 12 hours at 520° C. to form a catalyst designated as S. Catalyst S contained 7.6% by weight of metallic copper, and the amounts of the alkali metals were 0.43 equivalent per gram-atom of aluminum forming an ion exchange site.

The same faujasite was treated in the same way with an aqueous solution of silver nitrate containing 5% by weight of silver to form a catalyst designated as catalyst T. This catalyst contained 9.7% by weight of metallic silver, and the amounts of the alkali metals were 0.71 equivalent per gram-atom of the aluminum forming an ion exchange site.

Using 10.0 g. of the catalyst so obtained, the reaction was performed in the same way under the same conditions as set forth in Comparative Example 2. The results obtained are shown in Table 11 below.

TABLE II

| | Catalyst | |
|---|---|---|
| | S | T |
| Reaction temperature (° C.) | 380 | 380 |
| Reaction products (mol percent): | | |
| Benzene | 3.45 | 1.91 |
| Toluene | 23.42 | 22.41 |
| p-Xylene | 9.27 | 11.32 |
| m-Xylene | 24.81 | 37.24 |
| o-Xylene | 9.11 | 11.13 |
| $C_9$+aromatic | 16.36 | 13.70 |
| Xylene recovery (mol percent) | 43.19 | 56.69 |
| Concentration of p-xylene in the recovered xylenes (percent) | 21.46 | 18.96 |

COMPARATIVE EXAMPLE 4

Fifty grams of the same mordenite as used in Example 5 were subjected three times with an ion exchange treatment (for four hours each time) at 80° C. using 100 ml. of an aqueous solution of a nitrate containing 5.0% by weight of cadmium, aluminum, lanthnum, cerium, thallium, lead and manganese respectively. The treated mordenite was thoroughly washed with water, and calcined for 12 hours at 520° C. The catalysts obtained were designated respectively as catalysts CD, Al, La, Ce, TL, PB and MN. Using 10.0 g. of each of the catalysts obtained, the reaction was performed under the same conditions as used in Comparative Example 2. The results obtained are shown in Table 12.

TABLE 12

| Catalyst | Cd | Al | La | Ce | Tl | Pb | Mn |
|---|---|---|---|---|---|---|---|
| Reaction products (mol percent): | | | | | | | |
| Toluene | | | 0.1 | 0.2 | | | |
| p-Xylene | 1.9 | 2.0 | 2.3 | 2.5 | 0.6 | 1.8 | 1.0 |
| m-Xylene | 96.2 | 96.1 | 95.3 | 94.7 | 98.8 | 96.4 | 98.0 |
| o-Xylene | 1.9 | 1.9 | 2.2 | 2.4 | 0.6 | 1.8 | 1.0 |
| $C_9$+aromatic | | | 0.1 | 0.2 | | | |
| Xylene recovery (mol percent) | 100 | 100 | 99.8 | 99.6 | 100 | 100 | 100 |
| Concentration of p-xylene in the recovered xylenes (percent) | 1.9 | 2.0 | 2.3 | 2.5 | 0.6 | 1.8 | 1.0 |

EXAMPLE 9

Using catalyst J prepared in Example 5, m-xylene was fed at a flow rate of 22 g./hour at a reaction pressure of 5 kg./cm.$^2$ and at a reaction temperature of 410° C., flowing nitrogen ($N_2$) as a carrier gas at a flow rate of 24 N-liter/hour. The results obtained by the end of the 8-hour period after initiation of the reaction are shown in Table 13.

TABLE 13

| Reaction time (hours) | 0-2 | 2-4 | 4-6 | 6-8 |
|---|---|---|---|---|
| Reaction products (mol percent): | | | | |
| Toluene | 0.82 | 0.71 | 0.62 | 0.57 |
| p-Xylene | 22.80 | 21.90 | 21.32 | 21.10 |
| m-Xylene | 53.31 | 55.11 | 56.34 | 56.82 |
| o-Xylene | 22.42 | 21.70 | 21.19 | 21.01 |
| $C_9$+aromatic | 0.65 | 0.58 | 0.53 | 0.50 |
| Ratio of xylenes recovered (mol percent) | 98.53 | 98.71 | 98.85 | 98.93 |
| Concentration of p-xylene in the recovered xylenes (percent) | 23.14 | 22.19 | 21.57 | 21.33 |

What we claim is:

1. A process for isomerizing xylenes which comprises contacting xylenes at an elevated temperature with a catalyst composition comprising partially dealkalized mordenite-containing aluminosilicate, said aluminosilicate having a cation exchange capacity of not less than 60 m. eq./100 g., and containing on ion exchange sites formed by aluminum atoms constituting the framework of the pore structure in the aluminosilicate,
    (1) 0.1 to 0.7 equivalent of alkali and alkaline earth metal ion per gram atom of the aluminum,
    (2) 0.05 to 0.9 equivalent of at least one metal ion selected from the group consisting of copper, silver and chromium per gram atom of the aluminum and
    (3) not more than 0.45 equivalent of hydrogen per gram atom of the aluminum.

2. The process of claim 1 wherein said isomerization reaction is carried out in the presence of hydrogen gas.

3. The process of claim 1 wherein said aluminosilicate contains 0.2 to 18.0% by weight, calculated as metal based on the total amount of the catalyst composition, of at least one metallic element selected from the group consisting of copper, silver and chromium.

4. The process of claim 1 wherein said mordenite-containing aluminosilicate is partially dealkalized by ion exchange with an aqueous solution of an acid or an ammonium salt, and has supported thereon at least one metallic element selected from the group consisting of copper, silver and chromium.

5. The process of claim 1 wherein said mordenite-containing aluminosilicate is partially dealkalized by ion exchange with at least one metallic element selected from the group consisting of copper, silver and chromium.

6. The process of claim 1 wherein said mordenite is one having a CuKa X-ray diffraction peak of Bragg's reflective angle 2⊖=13.4°, 25.6°, 27.7°.

7. The process of claim 1 wherein the metal-ion (2) is present in an amount of 0.1 to 0.9 equivalent.

8. The process of claim 3 wherein said aluminosilicate content is 0.6 to 12.0% by weight of said metallic elements.

References Cited

UNITED STATES PATENTS 3,576,895    4/1971    Wise _____ 260—668 A

CURTIS R. DAVIS, Primary Examiner